US008850481B2

(12) United States Patent
Shannon et al.

(10) Patent No.: US 8,850,481 B2
(45) Date of Patent: Sep. 30, 2014

(54) SYSTEMS AND METHODS FOR MODIFYING AN INTERACTIVE MEDIA GUIDANCE APPLICATION INTERFACE BASED ON TIME OF DAY

(75) Inventors: Steve Shannon, Pacific Palisades, CA (US); Michael Ross Starkenburg, Costa Mesa, CA (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 11/541,248

(22) Filed: Sep. 29, 2006

(65) Prior Publication Data
US 2008/0092173 A1 Apr. 17, 2008

(51) Int. Cl.
| | |
|---|---|
| H04N 7/16 | (2011.01) |
| H04N 7/173 | (2011.01) |
| G06F 15/16 | (2006.01) |
| H04N 21/482 | (2011.01) |
| H04N 5/76 | (2006.01) |
| H04N 21/475 | (2011.01) |
| H04N 21/45 | (2011.01) |
| H04N 5/445 | (2011.01) |
| H04N 21/485 | (2011.01) |
| H04N 21/431 | (2011.01) |
| H04N 21/442 | (2011.01) |
| H04N 21/435 | (2011.01) |

(52) U.S. Cl.
CPC ......... *H04N 5/44543* (2013.01); *H04N 21/482* (2013.01); *H04N 5/76* (2013.01); *H04N 21/4755* (2013.01); *H04N 21/4532* (2013.01); *H04N 21/485* (2013.01); *H04N 21/4312* (2013.01); *H04N 21/44222* (2013.01); *H04N 21/4355* (2013.01)
USPC ............................................. 725/46; 725/47

(58) Field of Classification Search
USPC ...................................................... 725/46, 47
See application file for complete search history.

(56) References Cited

U.S. PATENT DOCUMENTS

| | | | |
|---|---|---|---|
| 5,524,195 A | 6/1996 | Clanton et al. | |
| 5,880,768 A | 3/1999 | Lemmons et al. | |
| 5,945,988 A * | 8/1999 | Williams et al. | ............... 715/747 |
| 6,177,931 B1 * | 1/2001 | Alexander et al. | ............... 725/52 |
| 6,438,752 B1 | 8/2002 | McClard | |
| 6,637,029 B1 * | 10/2003 | Maissel et al. | .................. 725/46 |
| 6,714,917 B1 | 3/2004 | Eldering et al. | |

(Continued)

FOREIGN PATENT DOCUMENTS

| | | |
|---|---|---|
| GB | 2377578 | 1/2003 |
| JP | 2003-018668 | 1/2003 |

(Continued)

*Primary Examiner* — Benjamin R Bruckart
*Assistant Examiner* — Carmine Malangone
(74) *Attorney, Agent, or Firm* — Ropes & Gray LLP

(57) ABSTRACT

Systems and methods for automatically displaying personalized interactive media guidance application screens based on the time of day are provided. The interactive media guidance application may monitor user interactions with the user equipment, and identify individual user profiles for different times of day. Using this information, the interactive media guidance application may partition the day into day parts, each associated with a user profile. The interactive media guidance application may also create or select a plurality of personalized interfaces or configurations for displaying media guidance information, where each interface or configuration reflects the interests of an identified user profile. When a user accesses the interactive media guidance application, the interactive media guidance application may identify the user profile associated with the current day part, and display the personalized interface or configuration associated with the identified user profile.

24 Claims, 14 Drawing Sheets

(56) References Cited

U.S. PATENT DOCUMENTS

| | | |
|---|---|---|
| 6,756,997 B1 | 6/2004 | Ward et al. |
| 6,973,621 B2 | 12/2005 | Sie et al. |
| 7,165,098 B1 | 1/2007 | Boyer et al. |
| 2002/0053078 A1 | 5/2002 | Holtz et al. |
| 2002/0120925 A1 | 8/2002 | Logan |
| 2002/0129368 A1 | 9/2002 | Schlack et al. |
| 2002/0166119 A1 | 11/2002 | Cristofalo |
| 2002/0174230 A1* | 11/2002 | Gudorf et al. ............... 709/227 |
| 2002/0198762 A1 | 12/2002 | Donato |
| 2003/0067554 A1 | 4/2003 | Klarfeld et al. |
| 2003/0093792 A1 | 5/2003 | Labeeb et al. |
| 2003/0110500 A1* | 6/2003 | Rodriguez ..................... 725/46 |
| 2004/0003405 A1* | 1/2004 | Boston et al. .................. 725/58 |
| 2004/0019907 A1 | 1/2004 | Li et al. |
| 2004/0073923 A1 | 4/2004 | Wasserman |
| 2004/0078814 A1* | 4/2004 | Allen ............................ 725/47 |
| 2004/0255321 A1* | 12/2004 | Matz ............................. 725/14 |
| 2005/0138659 A1 | 6/2005 | Boccon-Gibod et al. |
| 2005/0188402 A1* | 8/2005 | de Andrade et al. ........... 725/46 |
| 2006/0101490 A1 | 5/2006 | Leurs |
| 2006/0150216 A1* | 7/2006 | Herz et al. ..................... 725/50 |
| 2006/0156329 A1 | 7/2006 | Treese |
| 2007/0136751 A1 | 6/2007 | Garbow et al. |
| 2007/0288961 A1 | 12/2007 | Guldi et al. |
| 2008/0092155 A1 | 4/2008 | Ferrone et al. |

FOREIGN PATENT DOCUMENTS

| | | |
|---|---|---|
| JP | 2005-531239 | 10/2005 |
| JP | 2006-186513 | 7/2006 |
| WO | WO 97/47135 | 12/1997 |
| WO | WO 00/33233 | 6/2000 |
| WO | WO 00/79798 | 12/2000 |
| WO | WO 2004/004341 | 1/2004 |
| WO | WO 2008/042280 | 4/2008 |

* cited by examiner

SYSTEMS AND METHODS FOR MODIFYING AN INTERACTIVE MEDIA GUIDANCE APPLICATION INTERFACE BASED ON TIME OF DAY

BACKGROUND OF THE INVENTION

This invention is directed to systems and methods for automatically displaying personalized interactive media guidance application information and content based on the time of day.

Interactive media guidance applications, such as interactive television program guides, are well known in the art. Using an interactive media guidance application, users may access and organize enormous amounts of information and content. To assist the user in quickly finding content that matches the user's interests, the interactive media guidance application may determine the user's interests, and identify content that corresponds to the determined interests. Then, when the interactive media guidance application identifies a user that is currently using the user's equipment, the interactive media guidance application may display content and information that is most likely to be of interest to the user (e.g. in the form of recommendations for programs of interest to the user).

Many existing interactive media guidance applications require users to affirmatively perform an action to identify the current user. For example, the interactive media guidance application may require a user to log in. As another example, the interactive media guidance application may identify the user in response to the user entering unique information (e.g., the user enters a personal code for ordering on-demand content).

It would be desirable, therefore, for the interactive media guidance application to automatically identify the current user and to display personalized content for the identified user. In addition, it would be desirable to provide systems and methods for creating personalized interfaces or home pages for each user, where the home pages or interfaces include different content modules (e.g., recommendations, news, on-demand, recorded programs, local information, movie information and theater listings) that are selected based on each user's interests.

SUMMARY OF THE INVENTION

In accordance with the principles of the present invention, systems and methods for automatically identifying the current user and displaying personalized content for the identified user are provided. In addition, systems and methods for creating personalized interfaces or home pages for each user, where the home pages or interfaces include different content modules (e.g., recommendations, news, on-demand, recorded programs, local information, movie information and theater listings) that are selected based on each user's interests are also provided.

In some embodiments, the interactive media guidance application may display media guidance information in a first configuration at a first time of day, and in a second configuration at a second time of day, where the configuration specifies the modules of media guidance information that are displayed and the layout of the modules, and where the first and second configurations are different. The configurations may be different because they include different modules, the modules are located differently in the page, information is located differently within a module, or information displayed in a module are different. In some embodiments, the configuration may specify a skin, which may be different in the first and second configurations.

In some embodiments, the interactive media guidance application may monitor a plurality of users' interactions with the interactive media guidance application and determine the users' interests from the monitored interactions. The interactive media guidance application may also distinguish individual users from among the plurality of users that were monitored, and determine each user's interests. Based on each user's interests, the interactive media guidance application may select or create, either automatically or in response to a user instruction, a personalized interface or home page. The personalized interface or home page may include one or more modules (e.g., recommendations module, on-demand module, recorded programs module). The interactive media guidance application may configure the modules to reflect the user's interests (e.g., configure a recommendations module so that the recommended programs correspond to the user's interests). In some embodiments, the personalized interface or home page may also include a skin.

The interactive media guidance application may also, from the monitored user interactions, determine the times at which each user typically uses the user equipment. The interactive media guidance application may then partition each day into day parts based on the times at which when each user uses the user's equipment. The day parts may provide an indication to the interactive media guidance application of which user is using the user's equipment at any time of day.

When a user requests to access the interactive media guidance application, the interactive media guidance application may first determine the current time of day and identify the user associated with the current time of day (e.g. with the current day part). Then, the interactive media guidance application may display the personalized interface or home page of the identified user. When the interactive media guidance application later determines that another user is associated with the current time (e.g., the current time is in another day part), the interactive media guidance application may change the personalized interface or home page displayed, and display the interface or home page of the other user.

DETAILED DESCRIPTION

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 1:
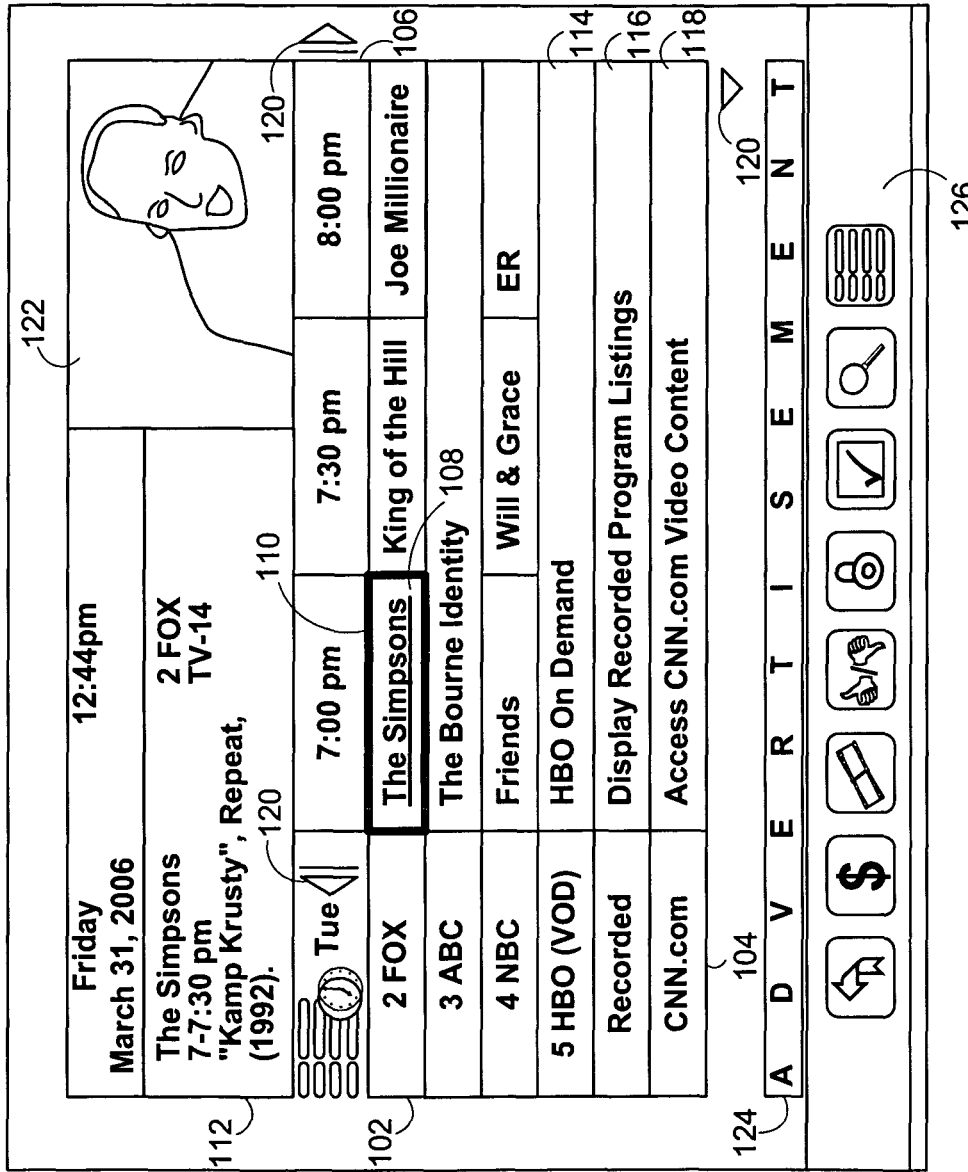
FIG. 1 shows an illustrative interactive media guidance application display screen in accordance with the principles of the present invention.
Figure 2:
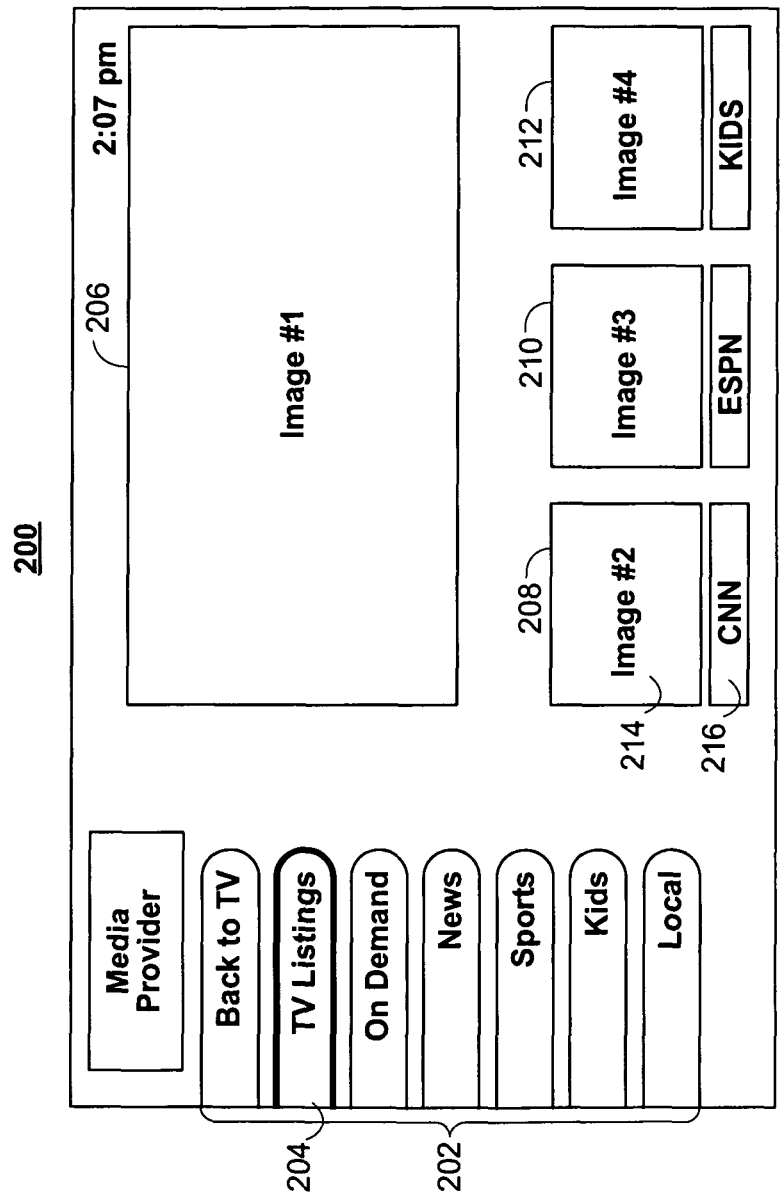
FIG. 2 shows another illustrative interactive media guidance application display screen in accordance with the principles of the present invention.

One of the functions of the media guidance application is to provide media listings and media information to users. FIGS. 1-2 show illustrative display screens that may be used to provide media guidance, and in particular media listings. The display screens shown in FIGS. 1-2 and 5-10 may be implemented on any suitable device or platform. While the displays of FIGS. 1-2 and 5-10 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND, THE SOPRANOS, and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004 and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicates to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
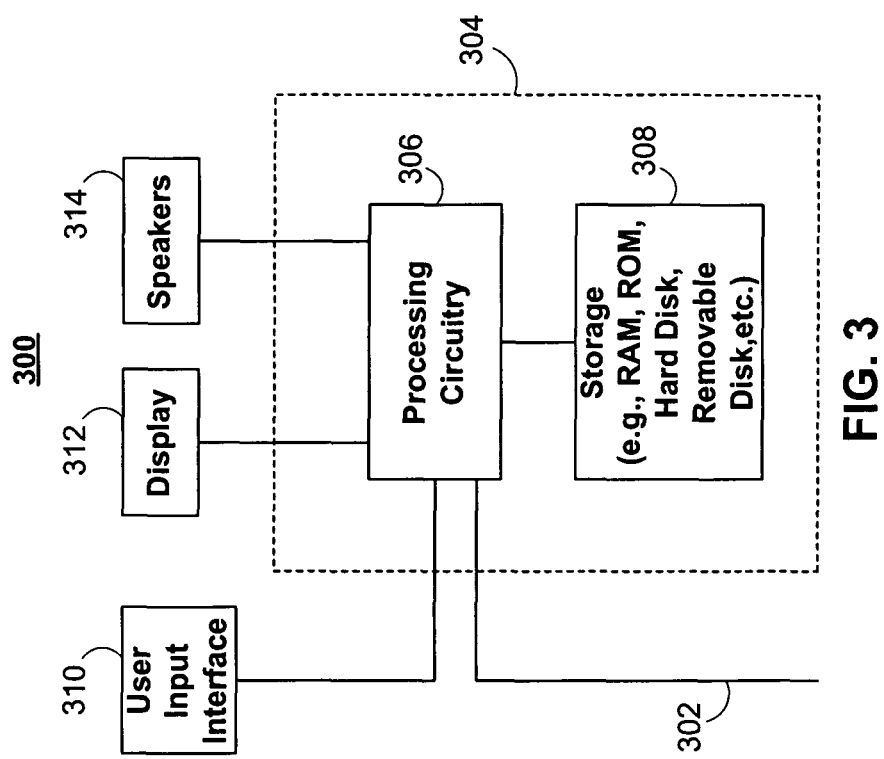
FIG. 3 is a diagram of an illustrative user equipment in accordance with the principles of the present invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306 based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits may also be included as part of circuitry 304. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 4:
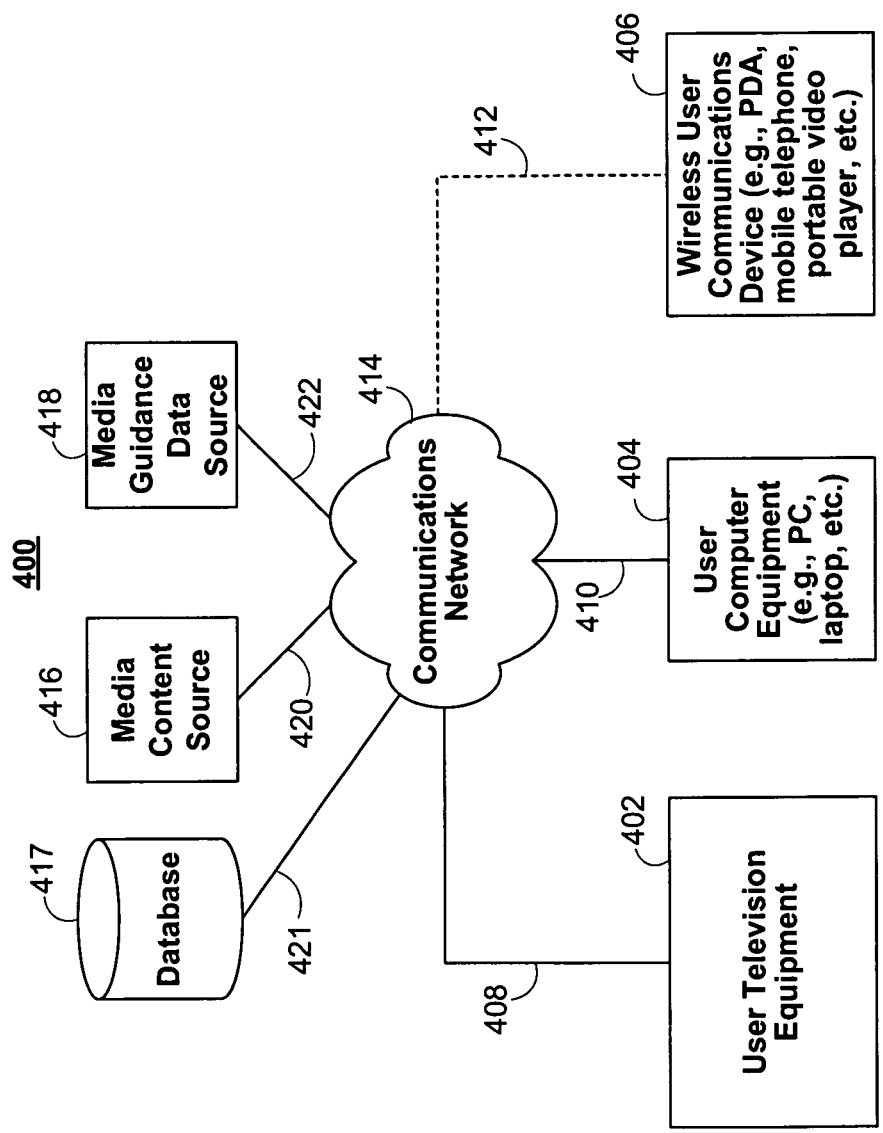
FIG. 4 is a diagram of an illustrative media system in accordance with the principles of the present invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a trademark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 that it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802.11x, etc.), or other short-range communication via wired or wireless paths. BLUETOOTH is a trademark owned by Bluetooth SIG, INC. The user equipment devices may also communicate with each other directly through an indirect path via communications network 414.

System 400 includes media content source 416, database 417, and media guidance data source 418 coupled to communications network 414 via communication paths 420, 421 and 422, respectively. Paths 420, 421 and 422 may include any of the communication paths described above in connection with paths 408, 410, and 412. Communications with the media content source 416, database 417, and media guidance data source 418 may be exchanged over one or more communications paths, but are shown as a single path in FIG. 4 to avoid overcomplicating the drawing. In addition, there may be more than one of each of media content source 416, database 417, and media guidance data source 418, but only one of each is shown in FIG. 4 to avoid overcomplicating the drawing. (The different types of each of these sources are discussed below.) If desired, two or more of media content source 416, database 417, and media guidance data source 418 may be integrated as one source device. Although communications between sources 416 and 418 and database 417 with user equipment devices 402, 404, and 406 are shown as through communications network 414, in some embodiments, sources 416 and 418 and database 417 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Database 417 may be used to store media guidance application features. In some embodiments, database 417 may include components that may be combined to form personalized user interfaces. For example, database 417 may include a library of modules, skins, layouts and rules governing the display of media guidance information. Database 417 may also include a library of pre-existing interfaces that are each associated with a set of generic user preferences (e.g., generic personalized interfaces). Database 417 may include libraries of rules governing the media that is displayed in each module (e.g., rules regarding the content that is displayed in a recommendations modules). The interactive media guidance application may receive components or entire personalized user interfaces from database 417 for display for particular users.

In some embodiments, database 417 may store user preference information provided by the interactive media guidance application (e.g., based on monitoring user interactions, or from user specified preferences). Database 417 may also store associations of user preferences with particular modules, skins, layouts, and rules. For example, database 417 may include a table in which each row includes a unique identifier, user preferences, and modules, layouts and rules associated with the user preferences. Database 417 may also store associations of user preferences with personalized interfaces. For example, database 417 may include a table in which each row includes a unique identifier, user preferences, and an identifier for a personalized interface. The personalized interfaces may be generic interfaces taken from existing libraries, or interfaces created by users and stored in database 417 by the interactive media guidance application.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

Figure 5:
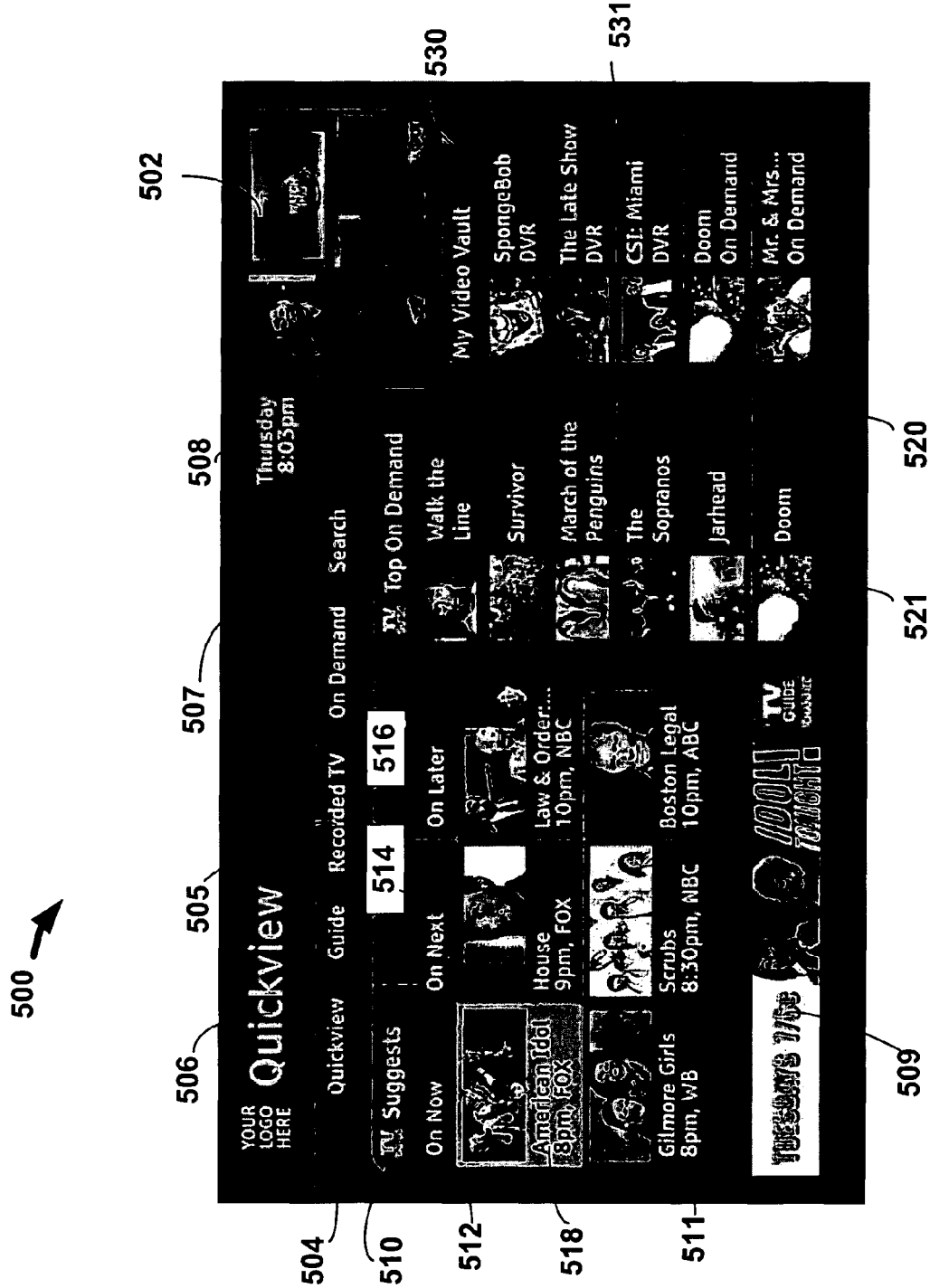
FIG. 5 shows an illustrative default interface in accordance with the principles of the present invention.

In some embodiments, when a user accesses the interactive media guidance application, the interactive media guidance application may display a default interface. The default interface may initially be the same for every user of the household. FIG. 5 shows illustrative initial interactive media guidance application interface 500 that may be displayed when the user accesses the interactive media guidance application.

Interface 500 includes video window 502, navigation bar 504, and modules 510, 520 and 530. As used herein, the term module refers to windows for displaying media guidance information, a plurality of which may be simultaneously displayed on an interactive media guidance application screen. The background of interface 500 is skin 507. In the illustrative interface of FIG. 5, the skin is a design created by the media guidance provider. Interface 500 includes date and time 508 and advertisement 509. Navigation bar 504 includes selectable options 505 for accessing interactive media guidance application menus or features available to the user. Interface 500 identifies the currently accessed menu, mode or feature in title 506.

Module 510 of interface 500 is a recommendations module. Module 520 includes listings 511 of media (e.g., television programs) that the interactive media guidance application recommends for the user. Listings 511 may include a title, channel, time, image or video, or any other suitable information. The user may select a listing using highlight region 518. Listings 511 may be organized in any suitable manner. In the example shown in illustrative interface 500, module 520 includes recommendations for programs currently being transmitted (On Now listings 512), recommendations for programs on next (On Next listings 514), and recommendations for programs on later (On Later listings 516). In some embodiments, the interactive media guidance application may display the currently transmitted content, or a video clip or still image of the content in video window 502 when the user highlights or selects the listing associated with the content.

The interactive media guidance application may select the recommended content displayed in module 510 in any suitable manner. For example, the interactive media guidance application may recommend content provided by preferred providers. As another example, the interactive media guidance application may recommend content that is most popular, most watched, or most recorded by other users (e.g., based on Nielson ratings).

The user may select module 510 to access the guide mode. In response to the user selection of the module, the interactive media guidance application may exit interface 500 and enter the guide mode (not shown). Once the user is in the guide mode, title 506 above navigation bar 504 may indicate that the current mode of the interactive media guidance application is the guide mode. The user may also access the guide mode my selecting the appropriate option on navigation bar 504.

Module 520 of interface 500 is an on-demand module. Module 520 includes listings 521 of on-demand media that is available for the user to view. Listings 521 may include a title, image or video, or any other suitable information. The listings displayed in module 520 may correspond to the on-demand content that has been the most requested (e.g., most purchased content), content of a given category or theme (e.g., action movies), or any other suitable subset of on-demand content. In some embodiments, the user may scroll through listings 521 of module 520. In some embodiments, the interactive media guidance application may display the on-demand content, or a video clip of the on-demand content in video window 502 when the user highlights or selects the listing associated with the content.

The user may select module 520 to access the on-demand mode. In response to the user selection of the module, the interactive media guidance application may exit interface 500 and enter the on-demand mode (not shown). Once the user is in the on-demand mode, title 506 above navigation bar 504 may indicate that the current mode of the interactive media guidance application is the on-demand mode. The user may also access the on-demand mode by selecting the appropriate option on navigation bar 504.

Module 530 of interface 500 is a recorded programs and VOD module. Module 530 includes listings 531 of recorded content that is available for the user to view. Listings 531 may include a title, image or video, or any other suitable information. The listings displayed in module 530 may correspond to recorded content that most highly rated (e.g., recorded with a high priority rating), content of a given category or theme (e.g., action movies), or any other suitable subset of recorded content. In some embodiments, the user may scroll through listings 531 of module 530. In some embodiments, the interactive media guidance application may display the recorded content, or a video clip of the recorded content in video window 502 when the user highlights or selects the listing associated with the content.

The user may select module 530 to access the recorded programs mode. In response to the user selection of the module, the interactive media guidance application may exit interface 500 and enter the recorded programs mode (not shown). Once the user is in the recorded programs mode, title 506 above navigation bar 504 may indicate that the current mode of the interactive media guidance application is the recorded programs mode. The user may also access the recorded programs mode by selecting the appropriate option on navigation bar 504.

Interface 500 is merely illustrative. It will be understood that any other module may be included in the interface, and that any other type of content may be displayed. In addition, it will be understood that the location of the modules and content on the screen is merely illustrative, and that any other suitable layout of modules may be used. The combination of a set of modules, the configuration of the modules and the layout of the modules may be referred to herein as a configuration in which interactive media guidance application information or content is displayed. As used herein, the term layout refers to the visual orientation of modules, media guidance information, and other elements displayed on an interactive media guidance application screen. The layout may be defined in any suitable manner including, for example, using x and y coordinates with any suitable origin (e.g., the lower left corner of the screen). The layout may also be defined using ordered lists of media guidance information to be displayed in the modules.

Figure 6:
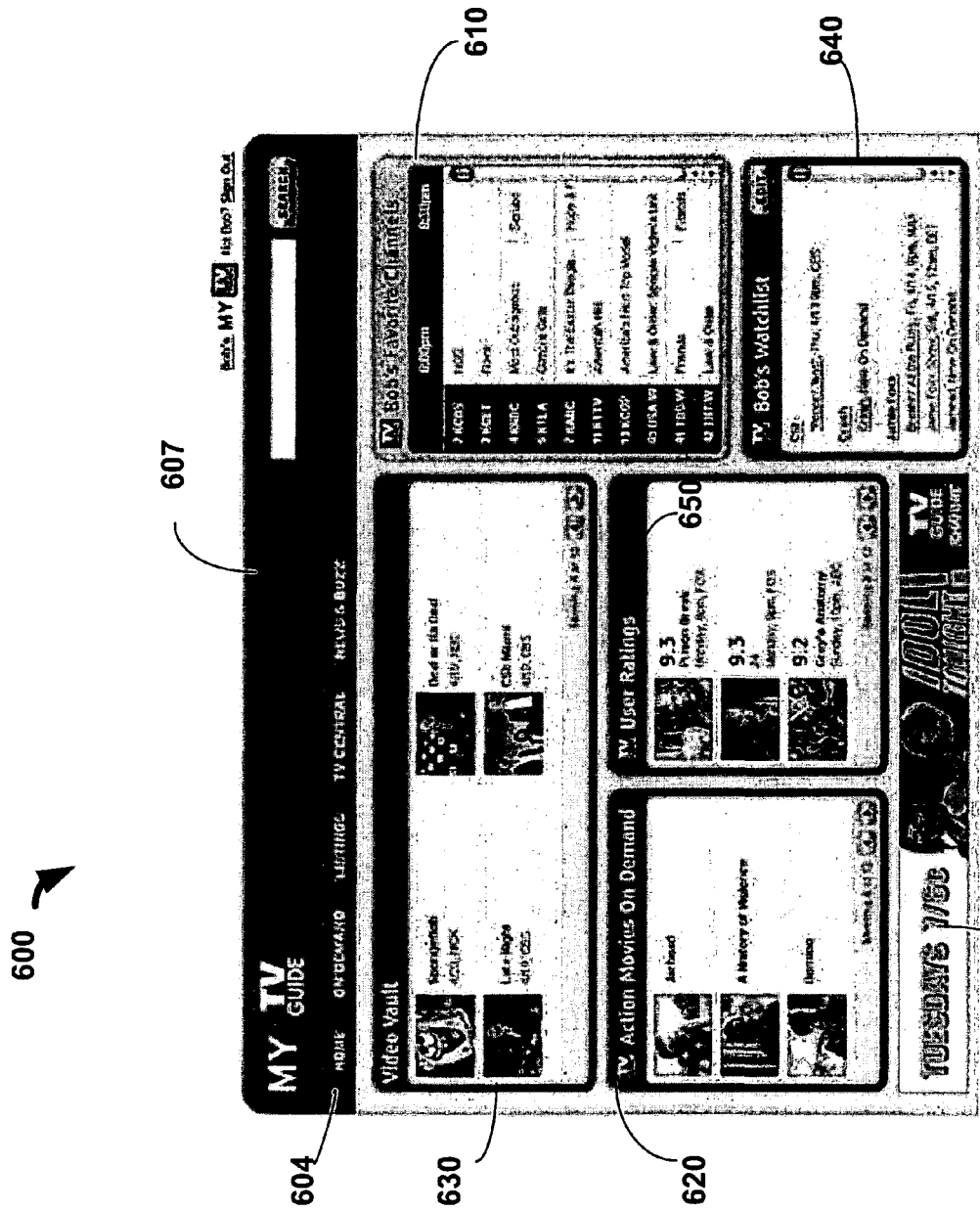
FIG. 6 shows an illustrative personalized interface in accordance with the principles of the present invention.
Figure 7:
FIG. 7 shows another illustrative personalized interface in accordance with the principles of the present invention.

With the increase in content providers, and the increase in types of content provided, it is becoming clear that providing a single interface for every user does not optimize each user's interactive media guidance application experience. Because each user may have different interests, it is desirable to display for each user a user-specific interface that corresponds to the user's interests when the user accesses the interactive media guidance application. The user specific interface may include modules, content, skins, or any other feature or content that may be displayed in the interface. FIGS. 6 and 7 show illustrative personalized interfaces.

FIG. 6 shows illustrative personalized interactive media guidance application interface 600 (e.g., personalized for Bob). Interface 600 includes navigation bar 604 and advertisement 609. The modules of interface 600 are displayed over skin 607. In the example shown in FIG. 6, skin 607 is a blue and gray color scheme, but any other skin may be used for interface 600. For example, the user may select a different color scheme, or one or more images as the skin (e.g., a Yankees logo for a New York Yankees fan).

Interface 600 includes modules 610, 620, 630, 640 and 650. Module 610 is a favorites module. Module 610 includes listings for each of the user's favorite channels (e.g., Bob's favorite channels). The user may select a listing, and view the channel associated with the listing in full screen.

Module 620 is an on-demand module. Module 620 includes listings for action movies that are available on-demand. The user may scroll through the listings of on-demand movies to view additional action movies. The user may select a listing to view the action movie associated with the listing.

Module 630 is a recorded programs module. Module 630 includes listings of programs that were recorded and that are available to the user. The recorded programs may be recorded with a local recording device (e.g., a local DVR), or by a network recording device. The user may scroll through the listings of recorded programs to view additional listings. The user may playback a recorded program by selecting the associated listing.

Module 640 is a watchlist module. Module 540 includes listings for programs, movies, artists, or other content that the user watches or records regularly. The content in the watchlist is the content that the user has an interest in. The listings may include the title of the program or movie, the name of the artist, transmission times and channels for programs, on-demand information for programs available on demand, titles for programs or movies starring an artist, or any other suitable information. The user may scroll through watchlist listings to view additional content of interest.

Module 650 is a user ratings module. Module 650 includes listings for the most popular programs, movies, artists, or other content, and an indication of a user rating. The ratings may be derived from individual ratings collected from a plurality users of the interactive media guidance application (e.g., users of a web-based interactive media guidance application). The ratings may be compiled, and the most popular programs may be listed in module 650. The listings in the module may include a title, transmission date and time, channel, image or video clip, or any other suitable information. In some embodiments, the user may select a listing to provide a rating for the program. The user may scroll through the listings to view additional ratings. In some embodiments, the user may select a listing to view the program associated with the listing, or to set up a recording, or to perform any other suitable operation with the program In some embodiments, the user may determine or modify the size of each module, as well as the color scheme of the module. In some embodiments, the user may select which modules to display, and/or the layout of the modules in the interface. The user may also modify the rules that specify which content is displayed in the various modules. For example, a user may specify that only comedies are displayed in the on-demand module, and only sporting events are displayed in the recorded programs module.

FIG. 7 shows another illustrative personalized interactive media guidance application interface. Interface 700 is an illustrative interface for a child. Interface 700 includes video window 702, navigation bar 704, and advertisement 709. Skin 707 provides the background for interface 700. In the example shown in FIG. 7, skin 700 is a default skin provided by the media provider. However, interface 700 may include any other skin such as, for example, a Sponge Bob skin (e.g., based on the child's interest in Sponge Bob Square Pants).

Interface 700 includes modules 710, 720 and 730. Module 710 is a recommendations module. The programs identified by the listings of recommendations module 710 are all programs that are directed to, or at least appropriate for children (e.g., Tom and Jerry, Full House, and Ice Age). As with recommendations module 510 of default interface 500 (FIG. 4), the child using the interactive media guidance application may select a listing from module 710 and access a currently transmitted program, or set up a recording.

Module 720 is an on-demand module. Module 720 includes listings of on-demand content that is directed to, or at least appropriate for children. In some embodiments, the content may be of interest to the child (e.g., Wallace and Gromit corresponds to an interest in claymation movies). In the example shown in FIG. 7, the interactive media guidance application has selected a number of movies that are rated G (e.g., Zathura, Yours, mine and ours, and Jimmy Neutron) or that were made with children as the target audience (e.g., Harry Potter). The interactive media guidance application may determine which content to list in module 720 in any suitable manner including, for example, selecting programs based on MPAA rating.

Module 730 is a recorded programs module. Module 730 includes listings of recorded programs that are available for the user to watch. The recorded programs may have been recorded locally (e.g., with a local DVR) or remotely (e.g., on a network server) by any user (e.g., another user of the household recorded the program on the local DVR). The recorded programs listed in module 730 may be for programs that are directed to, or at least appropriate for children (e.g., Sponge Bob).

The child associated with interface 700 may modify the interface in any suitable manner to personalize the interface. For example, the child may modify the skin of the interface, select other modules, change the layout of the selected modules, or perform any other suitable modification to the interface.

Figure 8:
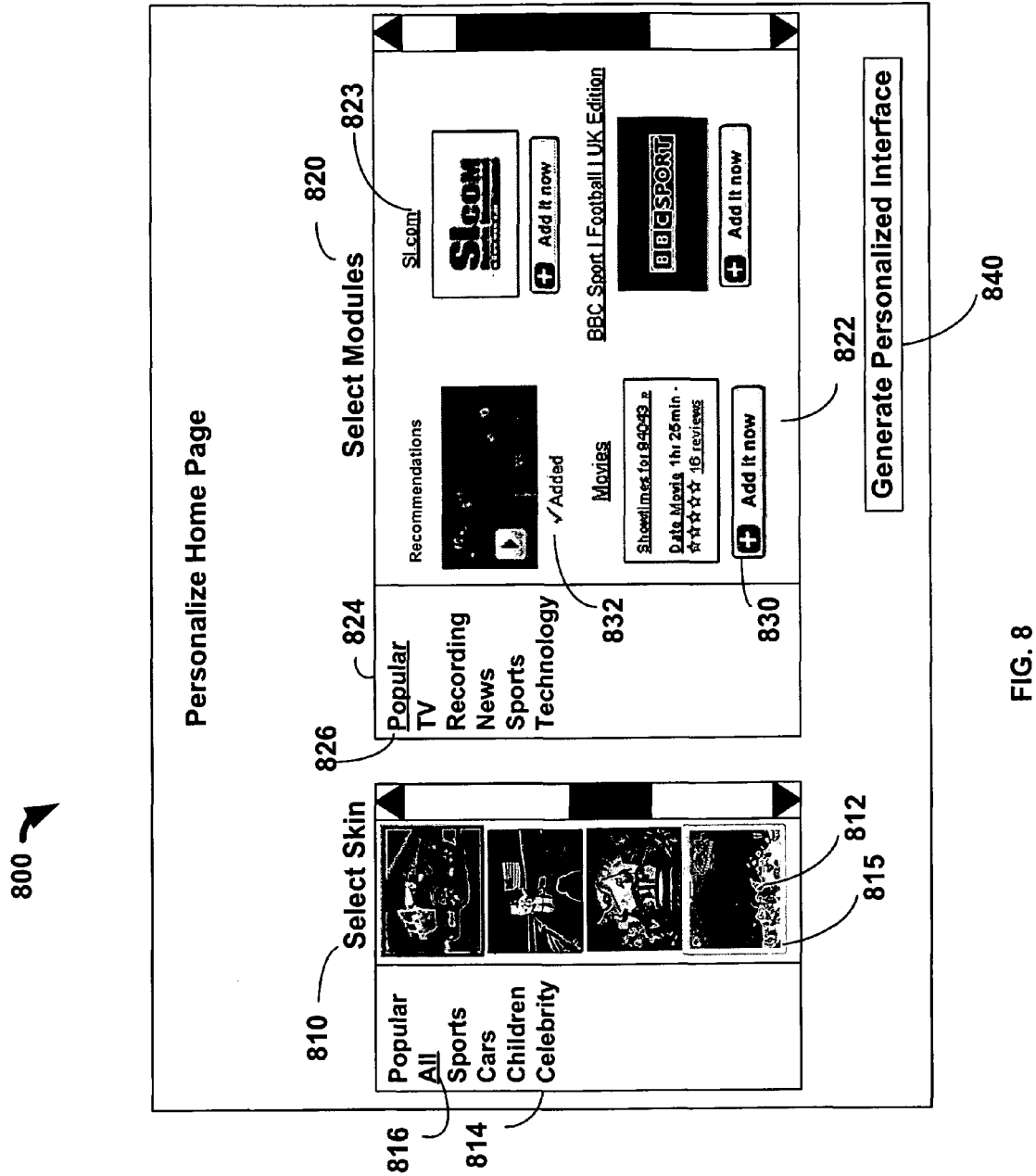
FIG. 8 shows an illustrative screen for personalizing a user's home page in accordance with the principles of the present invention.

The interactive media guidance application may create a personalized interface in any suitable manner. In some embodiments, the interactive media guidance application may prompt each user to create a personalized interface. FIG. 8 shows illustrative screen 800 for creating a personalized interface or home page. Screen 800 includes display area 810 for selecting a skin, and display area 820 for selecting modules. Display area 810 includes listings 812 of skins that a user may select for the personalized interface. Listings 812 include images of the skin. The listings may include any other suitable information such as, for example, title, author, color scheme, or any other suitable information for describing a skin. The user may scroll through listings 812 to view additional skins. The user may select a skin using highlight region 815.

The user may navigate through skins using menu 814. Menu 814 includes a plurality of options corresponding to categories of skins. In response to a user selection of a category, the interactive media guidance application may limit the skins displayed in listings 812 to those associated with the selected category. The categories listed in menu 814 include Popular, All, Sports, Cars, Children and Celebrity. It is understood, however, that any other suitable category may be used in menu 814. The interactive media guidance application may indicate that a particular category has been selected with marking 816. In the example of FIG. 8, marking 816 is an underline. Marking 816 may be any other suitable marking such as, for example, a different font, font size, font color, highlighting, bold, or any other suitable marking.

Display area 820 includes listings 822 of modules that a user may select to add to the personalized interface or home page. The listings may include an image (e.g., a screen shot), a logo, a title, a link to additional information (e.g., hyperlink 823), or any other suitable information. The user may select a module for the personalized interface by selecting Add option 830. Once the user has selected Add option 830, the interactive media guidance application may display indication 832 to inform that user that the module has been added to the personalized interface. For example, indication 832 in FIG. 8 indicates that the Recommendations module has been added to the user's personalized interface.

Display area 820 includes menu 824 of categories of modules. In response to a user selection of a category in menu 824, the interactive media guidance application may limit the modules displayed in display area 820 to those related with the selected category. The categories listed in menu 824 of FIG. 8 are Popular, TV, Recording, News, Sports and Technology. It is understood, however, that any other suitable category may be used in menu 824. The interactive media guidance application may indicate that a particular category has been selected with marking 826. In the example of FIG. 8, marking 826 is an underline (e.g., indicating that Popular is selected). Marking 826 may be any other suitable marking such as, for example, a different font, font size, font color, highlighting, bold, or any other suitable marking.

Figure 9:
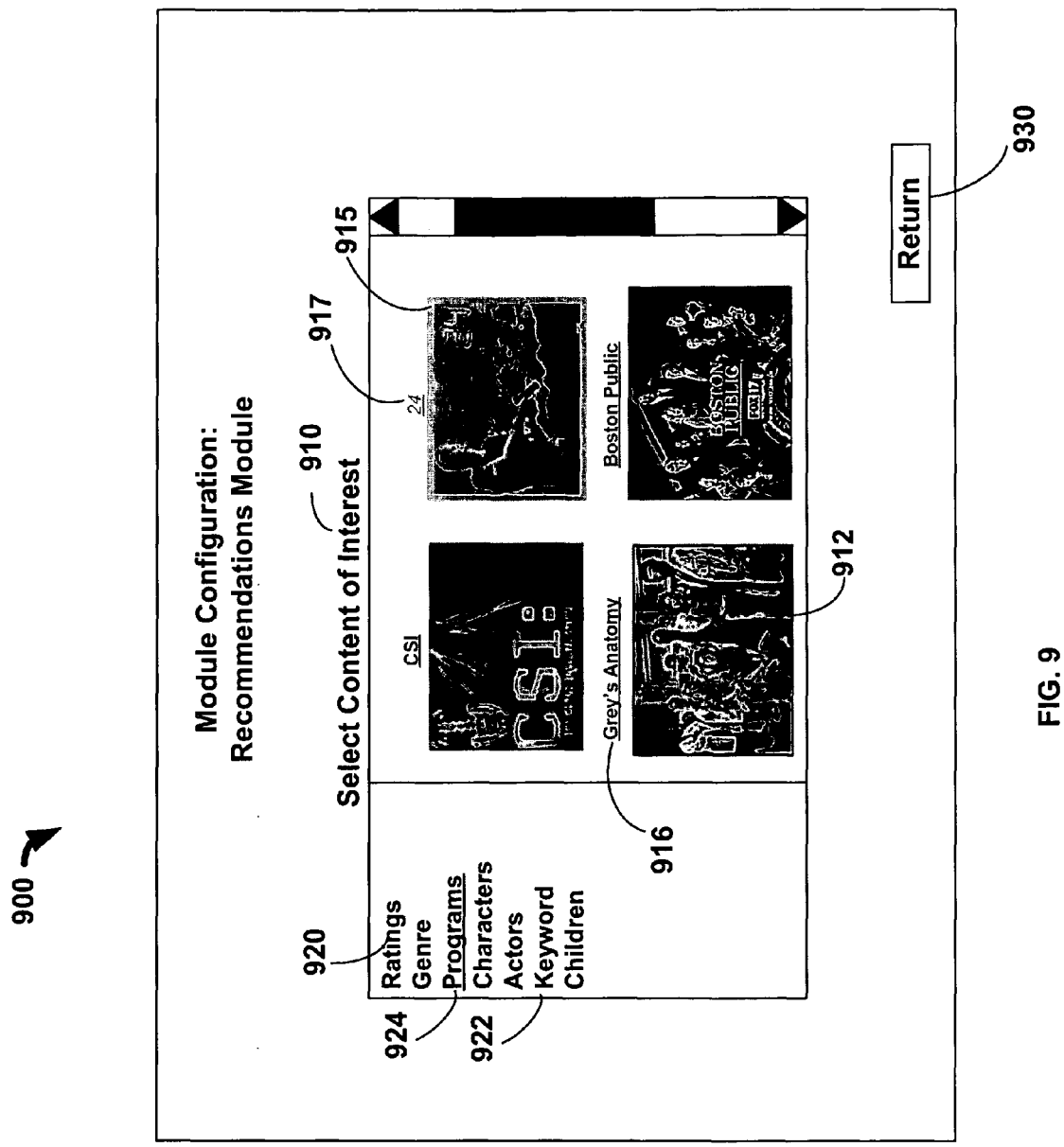
FIG. 9 shows an illustrative screen for configuring a module in accordance with the principles of the present invention.

In some embodiments, one or more of the modules may be configurable by the user. For example, the user may configure a Favorites module to specify interests based on which the module should identify content for the Favorites module. As another example, the user may configure a Recorded content module or an On-Demand module to specify which types of content should be displayed in the Recorded content and On-Demand modules (e.g., only action movies, or content starring Jamie Foxx). FIG. 9 shows illustrative screen 900 for configuring a module.

Illustrative screen 900 shows a screen for configuring a Recommendations module. It will be understood, however, that any other suitable module may have an associated configuration screen that may be similar to screen 900. Screen 900 includes display area 910 for selecting content of interest to the user. Display area 910 includes listings 912 of content that the user may select to specify interests that the interactive media guidance application will use to populate the recommendations module. In the example of screen 900, listings 912 include a title and an image. In other embodiments, listings 912 may also or instead include a video clip, a channel and time of transmission, a synopsis, or any other suitable information. The user may select title 916 of the listing to access additional information for the program associated with the listing (e.g., in a program page, or in a pop-up window). The user may scroll through the listings to view additional content.

The user may select a listing using highlight region 915. When the user has selected a listing, the interactive media guidance application may mark the listing to indicate to the user that the program or content associated with the listing has been selected for the module. For example, the interactive media guidance application may change the font of the title, change the color of the title, change the size of the title, place a border around the image, or modify the listing in any other suitable manner to indicate the user's selection. In the example of FIG. 9, the interactive media guidance application has changed the color of the title and changed the font from bold to italics (e.g., going from title 916 to title 917).

Screen 900 includes menu 920 of categories of information that the user may specify as part of the module configuration. The user may select from listings 920 of categories to view listings of options associated with the category in display area 910. Menu 920 may include any suitable category, and any suitable number of categories. In the example of FIG. 9, the illustrative categories include Ratings, Genre, Programs, Characters, Artists, Keyword and Children. In some embodiments, the user may be prompted to enter one or more keywords in the Keyword category. In response to receiving keywords, the interactive media guidance application may search the content provided by the content source (e.g., content source 416, FIG. 4) and identify the content that is related to the keywords (e.g., keywords are used in program descriptions or meta tags). It will be understood, however, that any other suitable category may be used.

The interactive media guidance application may indicate that a particular category has been selected with marking 924. In the example of FIG. 9, marking 924 is an underline (e.g., indicating that Programs is selected). Marking 924 may be any other suitable marking such as, for example, a different font, font size, font color, highlighting, bold, or any other suitable marking. Once the user has finished configuring the module, the user may return to the previous interactive media guidance application page (e.g., screen 800, FIG. 8) by selecting Return option 930.

Figure 10:
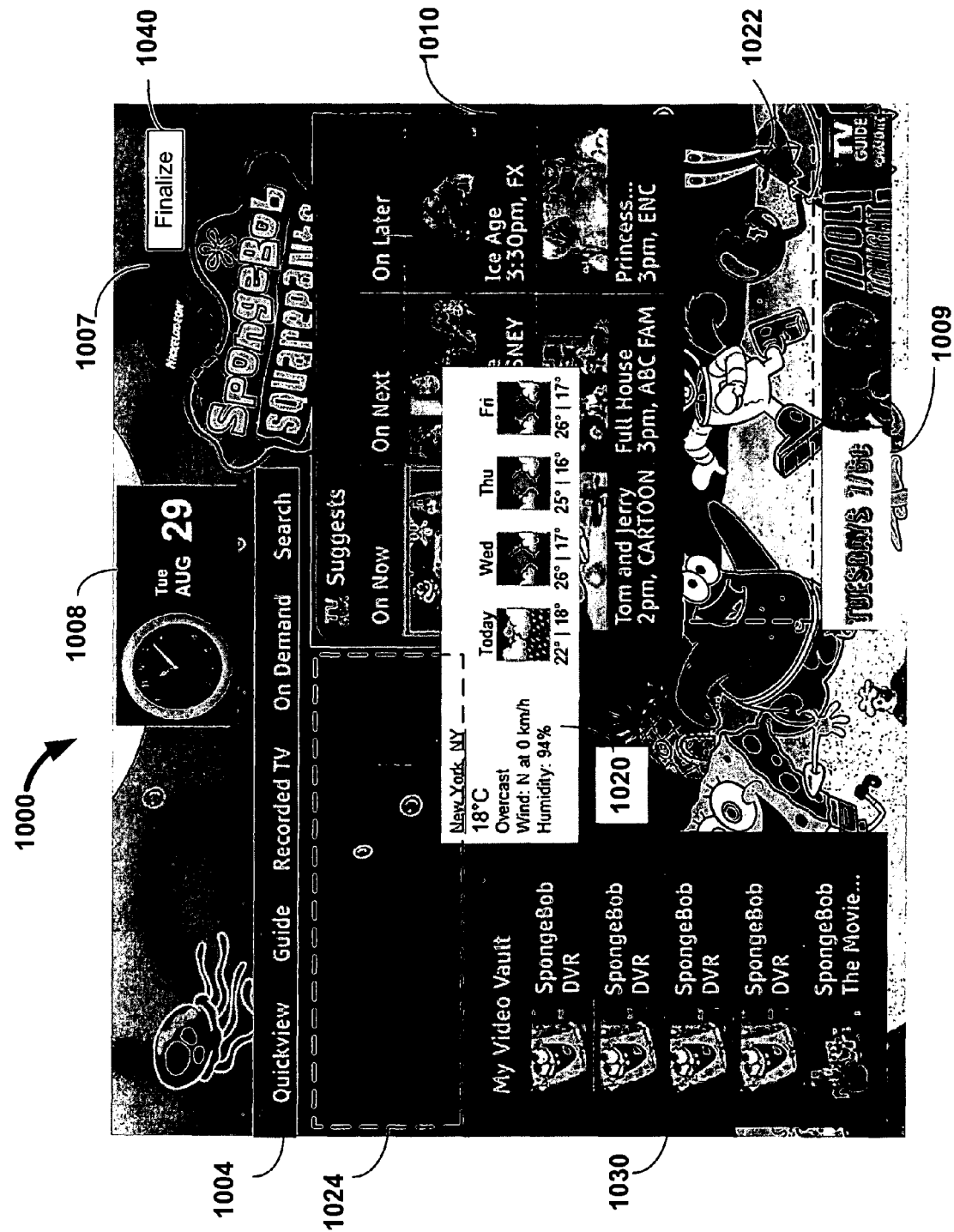
FIG. 10 shows an illustrative screen for modifying the layout of a personalized interface in accordance with the principles of the present invention.

Once the user has finished selecting modules and a skin in screen 800 (FIG. 8), the user may select option 830 to generate the personalized interface. FIG. 10 shows illustrative personalized interface 1000 that is generated in response to selecting option 830. Interface 1000 includes navigation bar 1004 and advertisement 1009. Interface 1000 is constructed over skin 1007, which is a Sponge Bob Square Pants skin (e.g., the skin selected from listings 812, FIG. 8).

Interface 1000 includes modules 1008, 1010, 1020 and 1030. Module 1008 is a time and date module. Module 1010 is a recommendations module. Module 1020 is a weather module. Module 1030 is a recorded programs module. Using interface 1000, the user may modify the layout of the modules. For example, the user may select a module, and move the module to a different position in interface 1000. In the example shown in FIG. 10, the user has selected weather module 1020, and is moving module 1020 from position 1022 to position 1024. Positions 1022 and 1024 may be identified for the user by outlines that appear when the user moves a module. In some embodiments, when a user moves a module, the other modules may automatically be displaced to make room for the module that is moved (e.g., module 1030 is lowered in the screen when module 1020 is moved to position 1024. In some embodiments, the user or the interactive media guidance application may resize one or more modules for a better fit.

Once the user has moved the modules into position, the user may direct the interactive media guidance application to finalize the personalized interface by selecting option 1040. In response to a user selection of option 1040, the interactive media guidance application may save the personalized interface for display when the user accesses the interactive media guidance application. In some embodiments, the user may return to screens 800, 900 and 1000 (FIGS. 8-10) at any time to modify an existing personalized interface.

In some embodiments, the interactive media guidance application may automatically create or select a personalized interface for each user. To ensure that a personalized interface reflects each user's interests, the interactive media guidance application may monitor each user's viewing habits and each user's interactions with the interactive media guidance application. The interactive media guidance application may then, from the monitored behavior, deduct each user's interests. Because it may not always be possible to identify users from the monitored interactions, the interactive media guidance application may instead identify sets of user preferences from the monitored interactions. The interactive media guidance application may use any suitable algorithm or scheme (e.g., an edge detection type algorithm or a relevancy rule) to determine which user interactions should be associated with a particular set of user preferences. Although the following discussion may describe features in the context of specific users, it will be understood that the features may also be implemented with sets of user preferences that are not associated with specific users.

Using the identified interests, the interactive media guidance application may create or select a personalized interface for each user. For example, the interactive media guidance application may create a personalized interface by selecting components (e.g., skin and modules) of the interface based on a user's interests. The interactive media guidance application may select components for particular user preferences using an edge detection-type algorithm, a relevancy rule, or any other suitable algorithm. In some embodiments, the interactive media guidance application select components using tables stored in database 417 (FIG. 4). For example, if the interactive media guidance application determines that the user is a child who likes Sponge Bob and other cartoons, and that the child enjoys watching baseball, the interactive media guidance application may select a Sponge Bob skin, and select a recommendations module, a recorded programs module, and a sports news module from the modules and skins available in database 417. The interactive media guidance application may configure the modules to display information related to cartoons and baseball (e.g., recommend cartoons and baseball games, show recorded cartoons, and display baseball updates) by selecting appropriate rules from database 417. The interactive media guidance application may layout the modules in any suitable manner including, for example, based on best fit of the modules, to emphasize a particular module (e.g., the recommendations module), to display the most relevant portions of the skin, or in any other suitable manner. The interactive media guidance application may select the layout from a library of layouts stored in database 417. In some embodiments, the user may modify the personalized interface created by the interactive media guidance application.

As another example, the interactive media guidance application may select an existing personalized interface for the user based on the identified user interests. In some embodiments, the interactive media guidance application may have access to a library of pre-existing personalized interfaces, or to templates for personalized interfaces stored in database 417. Each of the pre-existing personalized interfaces or templates may be associated with a set of interests. The interactive media guidance application, the media source, or an operator may associate each pre-existing personalized interface or template with a set of interests (e.g., generic user preferences) using an edge detection-type algorithm, a relevancy rule, or any other suitable algorithm or approach. The associations may be stored in database 417 for use by the interactive media guidance application (e.g., in a table). The interactive media guidance application may identify the set of interests that most resembles the user's interests, and select the pre-existing personalized interface or template that is associated with the identified set of interests.

The interactive media guidance application may create or select a personalized interface for a user at any suitable time. In addition, the interactive media guidance application may update an existing personalized interface to reflect the latest interests identified from the user's behavior at any suitable time. For example, the interactive media guidance application may create or select a new personalized interface each time the user accesses the interactive media guidance application, or may update an existing personalized interface each time the user accesses the interactive media guidance application.

To optimize each user's viewing experience, the interactive media guidance application may determine which user is using the user equipment, and display that user's personalized interface when the user accesses the interactive media guidance application. The interactive media guidance application may use any suitable approach to determine which user is using the user equipment. In some embodiments, the interactive media guidance application may prompt the user to identify himself when the user attempts to access the interactive media guidance application (e.g., with a question in a pop-up window). In some embodiments, the interactive media guidance application may automatically determine which personalized interface to display.

To automatically determine which personalized interface to display, the interactive media guidance application may first monitor the viewing habits of all of the users of the interactive media guidance application. For example, the interactive media guidance application may include an application that logs every time the user equipment is turned on, turned off, which content is accessed (e.g., which television programs are watched), and which interactive media guidance application features are displayed. For example, control circuitry 304 (FIG. 3) may direct storage 308 (FIG. 3) to store the logs with the monitored user interactions.

Once the interactive media guidance application has logged the users' interactions, the interactive media guidance application may identify specific user profiles from the interactions. For example, the interactive media guidance application may use metadata associated with content that is accessed (e.g., genre, title, description, actors) and metadata that is associated with interactive media guidance application features that are displayed (e.g., news information, sports scores, recommended programs that are selected). More specifically, control circuitry 104 may retrieve logs stored in storage 308, and analyze the metadata to identify patterns. Once the interactive media guidance application has identified user profiles based on the logged patterns, the interactive media guidance application may compare the profiles with days and times of days at which the user equipment was turned on (e.g., based on logged information stored in storage 308). The interactive media guidance application may then associate particular user profiles with the days and times of day (e.g., day parts) at which the user fitting a user profile used the user equipment (e.g., associate weekdays, 2-3 PM with the user profile that is associated with cartoons and that watches cartoons from 2-3 on Wednesdays). For example, control circuitry 304 may store the day parts and associations with user profiles in storage 308. If the interactive media guidance application knows the identify of the user using the user equipment (e.g., the users identified themselves when the interactive media guidance application was set up, or when a user accesses a premium feature), the interactive media guidance application may associate the corresponding user profile with the user (e.g., during the day part associated with a user profile, ask the user whether the user is "John." If yes, the interactive media guidance application may associate the user profile with user "John").

The following example will serve to illustrate this process. A television is turned on every weekday from 7-8:30 AM and the user watches a mixture of morning talk shows. The television is then turned on again from 2-5 PM. The user watches mainly soap operas from 2-3 PM and then cartoons from 3-5 PM. Using an edge detection-type algorithm (e.g., which serves to determine how close two programs are to each other), the interactive media guidance application may determine that there is little relevancy between what is watched from 2-3 PM and what is watched from 3-5 PM. But, again using the edge detection-type algorithms, the interactive media guidance application may determine that what is watched from 7-8:30 AM and what is watched from 2-3 is similar and fits the same profile, for example profile A. The profile for the user who watches cartoons is profile B. The interactive media guidance application may further determine, from the monitored interactions, that on weekends the television is turned on from 7-10 AM and the user watches mainly cartoons. This viewing pattern has a high relevancy to the viewing pattern of profile B. Thus, by the end of the week, the interactive media guidance application may have identified two dominant user profiles that use this television—profile A that likes morning talk shows and soap operas, and profile B that likes cartoons.

Once the interactive media guidance application has partitioned the day and associated at least some portions of the day to a user, the interactive media guidance application may use the partitioning to determine which personalized interface to display at each time of day. When a user requests to access the interactive media guidance application, the interactive media guidance application may first determine the current time of day and the day part into which the current time of day falls. Using the day part, the interactive media guidance application may identify the user or user profile associated with the day part (e.g., control circuitry 304 may retrieve from storage 308 the user or user profile that is associated with the day part). Once the interactive media guidance application has identified the appropriate user profile or user, the interactive media guidance application may retrieve from memory (e.g., control circuitry 304 may retrieve from storage 308) the personalized interface associated with the user or user profile, and display the personalized interface.

If the interactive media guidance application has not associated the current time of day with any user or user profile, the interactive media guidance application may display any suitable interactive media guidance application interface. For example, the interactive media guidance application may display the personalized interface of the user associated with a previous day part, the personalized interface of the user associated with a subsequent day part, or a default interface.

In some embodiments, the interactive media guidance application may apply the same partitioning to a number of days of the week (e.g., apply the same partitioning from Monday through Friday). In some embodiments, however, the interactive media guidance application may partition each day separately to attempt to predict unusual viewing patterns for some users. For example, the interactive media guidance application may determine that a user does not miss a Yankees game, which are typically at 7 PM. The interactive media guidance application then associates the 7-10 PM time each evening with the user. If the interactive media guidance application determines, for example from interactive media guidance application data provided by data source 418 (FIG. 4), that the Yankees play a game from 1-4 PM on Thursday, the interactive media guidance application may associate the 1-4 PM time on Thursday with the user.

In some embodiments, the user may correct the interactive media guidance application if an incorrect personalized interface is displayed. For example, the interactive media guidance application may display the personalized interface associated with the mother from 9-11 AM. If, one day, the father is sick and at home watching television from 9-11 AM, the father may direct the interactive media guidance application not to display the mother's personalized interface, but instead to display the father's personalized interface. In some embodiments, the interactive media guidance application may determine that the father's use is an isolated occurrence and disregard it from its analysis of the father's viewing habits.

Figure 11:
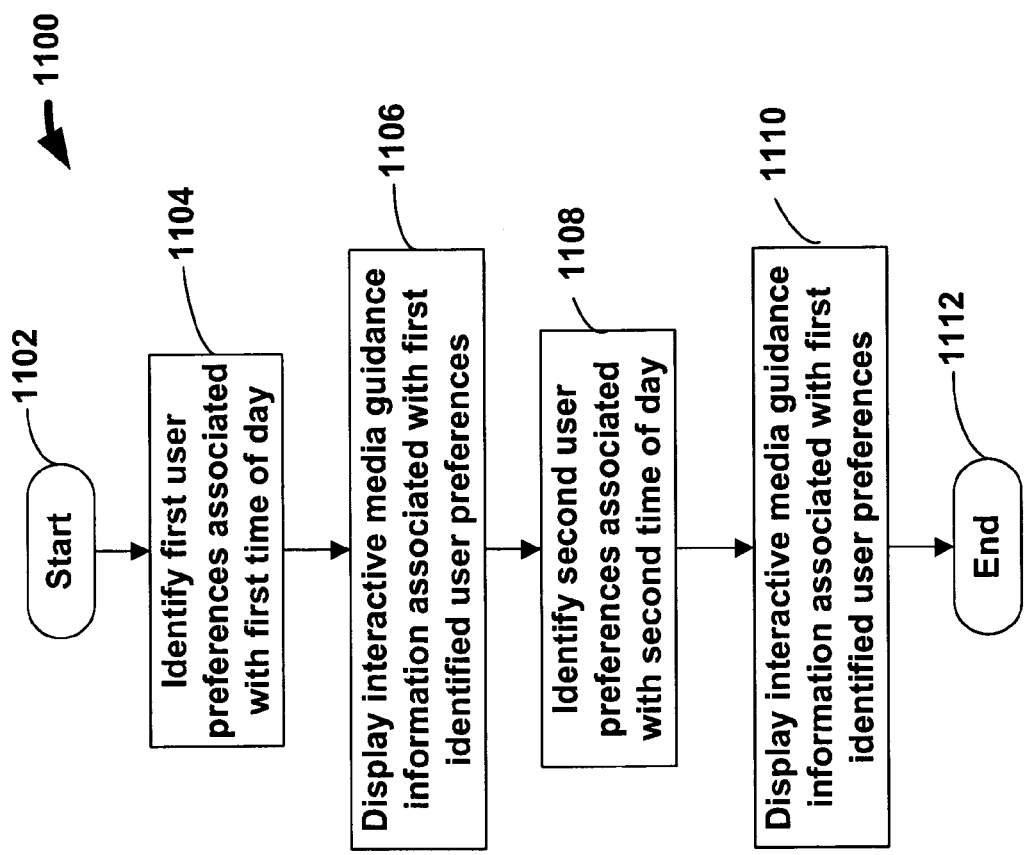
FIG. 11 is an illustrative flow chart of a process for displaying interactive media guidance application information in different configurations at different times in accordance with the principles of the present invention.

The following flow charts serve to illustrate processes involved in some embodiments of this invention. FIG. 11 is a flow chart of an illustrative process for displaying personalized interfaces using an interactive media guidance application. Process 1100 begins at step 1102. At step 1104, the interactive media guidance application identifies first user preferences associated with a first time of day. For example, control circuitry 304 (FIG. 3) may identify the current time of day and determine, from associations stored in storage 308 (FIG. 3), the user preferences that are associated with the current time of day. The interactive media guidance application may associate user preferences with times of day based on when the user associated with the user preferences uses the user equipment (e.g., associate user preferences with the times when the user having those user preferences is watching television). At step 1106, the interactive media guidance application displays interactive media guidance information that is associated with the first user preferences. For example, control circuitry 308 may identify media guidance information that is associated with the first user preferences (e.g., using an edge detection-type algorithm or a relevancy rule) and select the identified media guidance information for display. In some embodiments, control circuitry 308 may receive from database 417 (FIG. 4) modules, a layout, and rules or configurations for the modules used for displaying the media guidance information. The data received from database 417 may be associated with the first user preferences (e.g., selected using tables associating user preferences with modules, layouts and rules). The media guidance information displayed may be selected from the modules and rules received from database 417, and thus associated with the first user preferences through the association of the modules and rules with the first user preferences.

At step 1108, the interactive media guidance application identifies second user preferences associated with a second time of day. For example, control circuitry 304 may identify the new current time of day and determine, from associations stored in storage 308 (FIG. 3), the user preferences that are associated with the current time of day. At step 1110, the interactive media guidance application displays interactive media guidance information that is associated with the second user preferences. For example, control circuitry 308 may identify media guidance information that is associated with the second user preferences (e.g., using an edge detection-type algorithm or a relevancy rule) and select the identified media guidance information for display. In some embodiments, control circuitry 308 may receive from database 417 (FIG. 4) modules, a layout, and rules or configurations for the modules used for displaying the media guidance information. The data received from database 417 may be associated with the second user preferences (e.g., selected using tables associating user preferences with modules, layouts and rules). The media guidance information displayed may be selected from the modules and rules received from database 417, and thus associated with the second user preferences through the association of the modules and rules with the second user preferences. Process 1100 then ends at step 1112.

Figure 12:
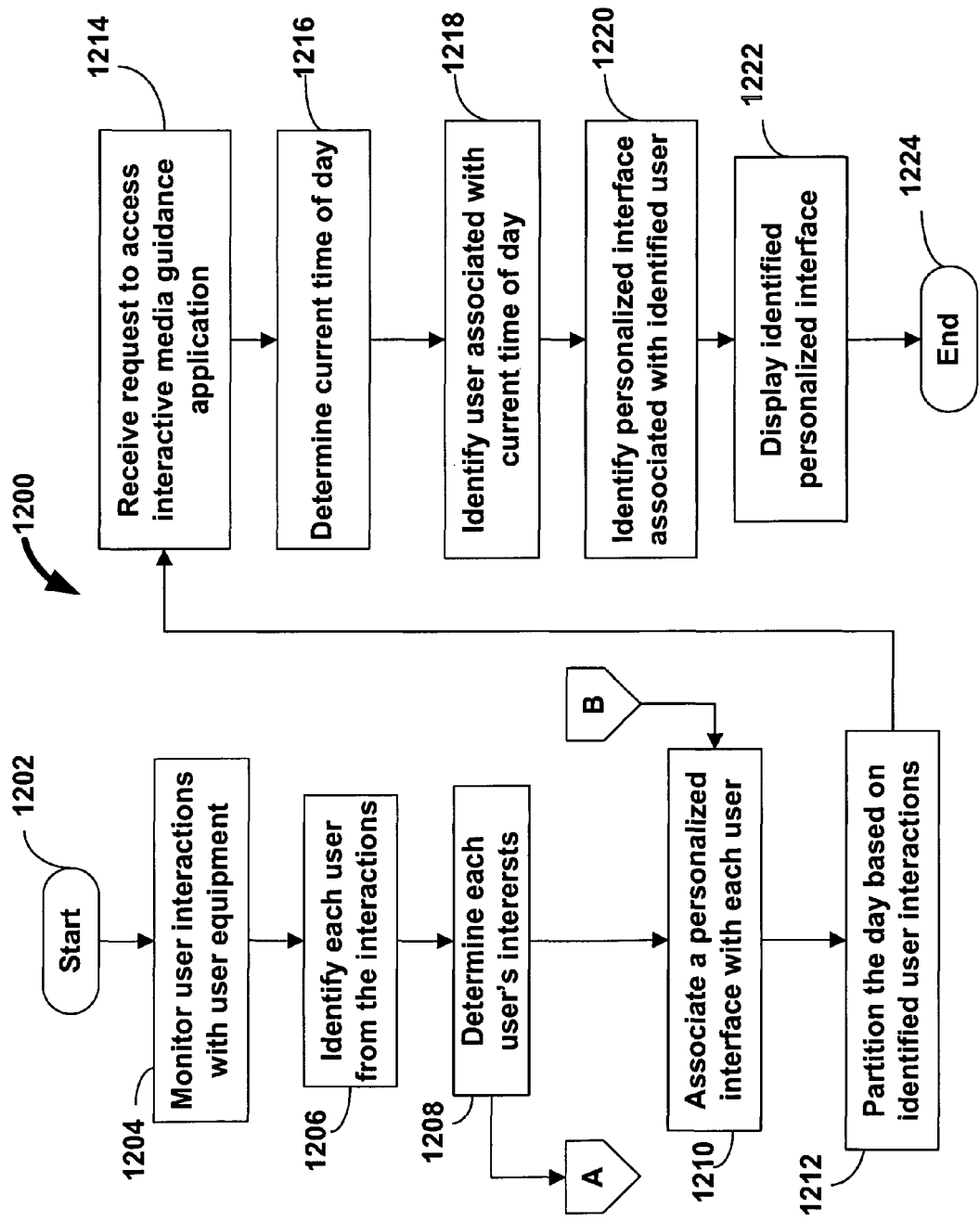
FIG. 12 is an illustrative flow chart of a process for displaying a personalized interface in accordance with the principles of the present invention.

FIG. 12 is a flow chart of an illustrative process for displaying a personalized interface. Process 1200 begins at step 1202. At step 1204, the interactive media guidance application monitors the interactions of users with the user equipment. For example, the interactive media guidance application may monitor the television programs or other content users watch, the user's selections in the interactive media guidance application (e.g., which programs the user requests detailed information for), the features of the interactive media guidance application that the user selects (e.g., sports news feature), or any other user interaction with the interactive media guidance application. The interactive media guidance application may also monitor the times at which users use the user equipment. At step 1206, the interactive media guidance application identifies the different sets of users from the monitored interactions. For example, the interactive media guidance application may determine that the interactions related to sporting events are all associated with a first user, the interactions related to cartoons are associated with a second user, and the interactions related to day-time soap operas are associated with a third user. The interactive media guidance application may use any suitable algorithm or process for determining which interactions are closely related enough that they can be associated with the same user (e.g., to associate interactions related to sporting events and action movies with the same user).

At step 1208, the interactive media guidance application determines each user's interests based on the interactions monitored at step 1204. For example, if the interactive media guidance application determines that a particular user watches Sponge Bob, the interactive media guidance application may deduct that the user is interested in cartoons, and other children's content. In some embodiments, the interactive media guidance application may skip step 1206, and instead of identifying users, identify sets of user preferences. Process 1200 may then continue based on the user preferences that were identified. At step 1210, the interactive media guidance application associates a personalized interface with each user identified at step 1206. The personalized interface may include modules and content that are related to the user's interests identified at step 1208. In some embodiments, the interactive media guidance application may select a personalized interface from a library of pre-existing personalized interfaces stored in database 417 (FIG. 4).

At step 1212, the interactive media guidance application partitions the day based on the user interactions identified at step 1204. In particular, the interactive media guidance application may partition the day by user based on the times at which each user uses the user's equipment. For example, the interactive media guidance application may associate the times of day when a first user typically watches television with the first user, and times of day when a second user typically watches television with the second user.

At step 1214, the interactive media guidance application receives a request from a user to access the interactive media guidance application. For example, a user may request to access an interactive media guidance application screen (e.g., interface 600, FIG. 6). At step 1216, the interactive media guidance application determines the current time of day. For example, the interactive media guidance application may determine the current time of day from control circuitry 304 (FIG. 3), content source 416, or data source 418 (FIG. 4). At step 1218, the interactive media guidance application identifies the user associated with the current time of day determined at step 1216. For example, the interactive media guidance application may refer to the day partitioning of step 1212, and identify the user that is associated with the current day part.

At step 1220, the interactive media guidance application identifies the personalized interface associated with the user identified at step 1218. In some embodiments, the interactive media guidance application may instead identify a configuration for displaying interactive media guidance application information that is associated with the identified user. At step 1222, the interactive media guidance application displays the personalized interface identified at step 1220. Process 1200 ends at step 1224.

Figure 13:
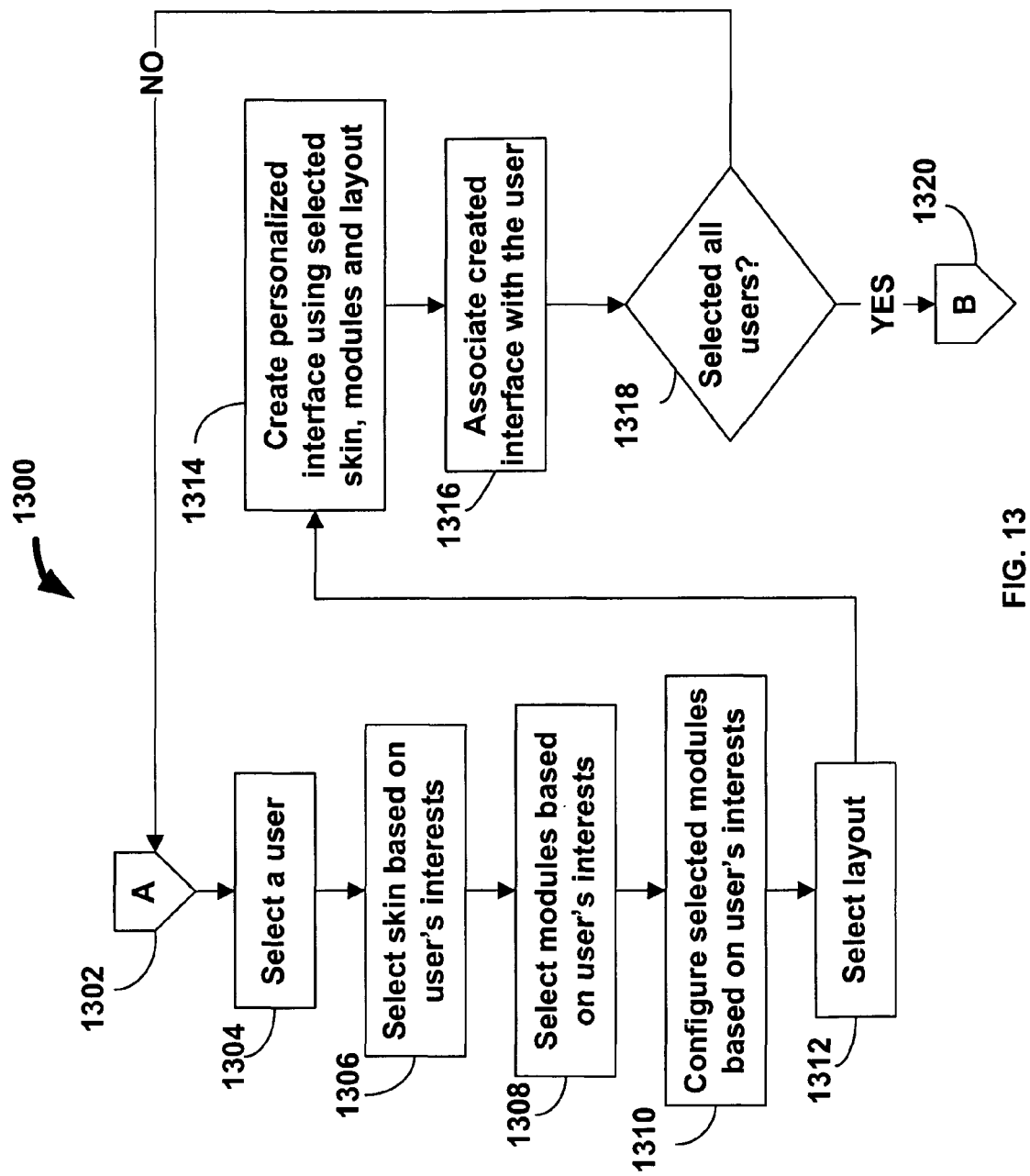
FIG. 13 is an illustrative flow chart of a process for automatically generating a personalized interface in accordance with the principles of the present invention.

FIG. 13 is an illustrative process for automatically selecting a personalized interface. Process 1300 begins at step 1302, which may correspond to step 1208 of process 1200 (FIG. 12). At step 1304, the interactive media guidance application selects a user. For example, the interactive media guidance application may select a user from the users identified at step 1206 of process 1200 (FIG. 12). In some embodiments, the interactive media guidance application may select a set of user preferences instead of selecting a user. The interactive media guidance application may continue with process 1300 using the user preferences to automatically select a personalized interface.

At step 1306, the interactive media guidance application selects a skin based on the user's interests. The interactive media guidance application may identify the user's interests from step 1208 of process 1200 (FIG. 12). At step 1308, the interactive media guidance application selects modules based on the user's interests. At step 1310, the interactive media guidance application configures the modules selected at step 1308 based on the user's interests. For example, the interactive media guidance application may determine a user that likes baseball. The interactive media guidance application may then select a New York Yankees skin, a recommendations module, a sports news module, a sports grid guide, and an on-demand module. The interactive media guidance application may further configure the modules to display content or information that is related to baseball (e.g., recommend baseball games).

At step 1312, the interactive media guidance application selects a layout for the modules selected at step 1308. In some embodiments, the interactive media guidance application may re-size one or more modules to fit a particular layout. At step 1314, the interactive media guidance application creates a personalized interface using the selected skin, modules and layout. At step 1316, the interactive media guidance application associates the personalized interface with the user selected at step 1304.

The interactive media guidance application may select the skin, modules and layout from libraries of skins, modules and layouts available in database 417 (FIG. 4). In some embodiments, the interactive media guidance application may provide the complete personalized interface to database 417, which may store the personalized interface. To later access the personalized interface, the interactive media guidance application may request that database 417 provide the personalized interface for display.

At step 1318, the interactive media guidance application determines whether every user identified at step 1206 of process 1200 has been selected. If the interactive media guidance application determines that every user has not been-selected (e.g., that every user does have a personalized interface), process 1300 moves back to step 1304 where the interactive media guidance application selects another user.

If, at step 1318, the interactive media guidance application instead determines that every user has been selected, process 1300 moves to step 1320 and ends. In some embodiments, step 1320 may correspond to step 1210 of process 1200 (FIG. 12).

Figure 14:
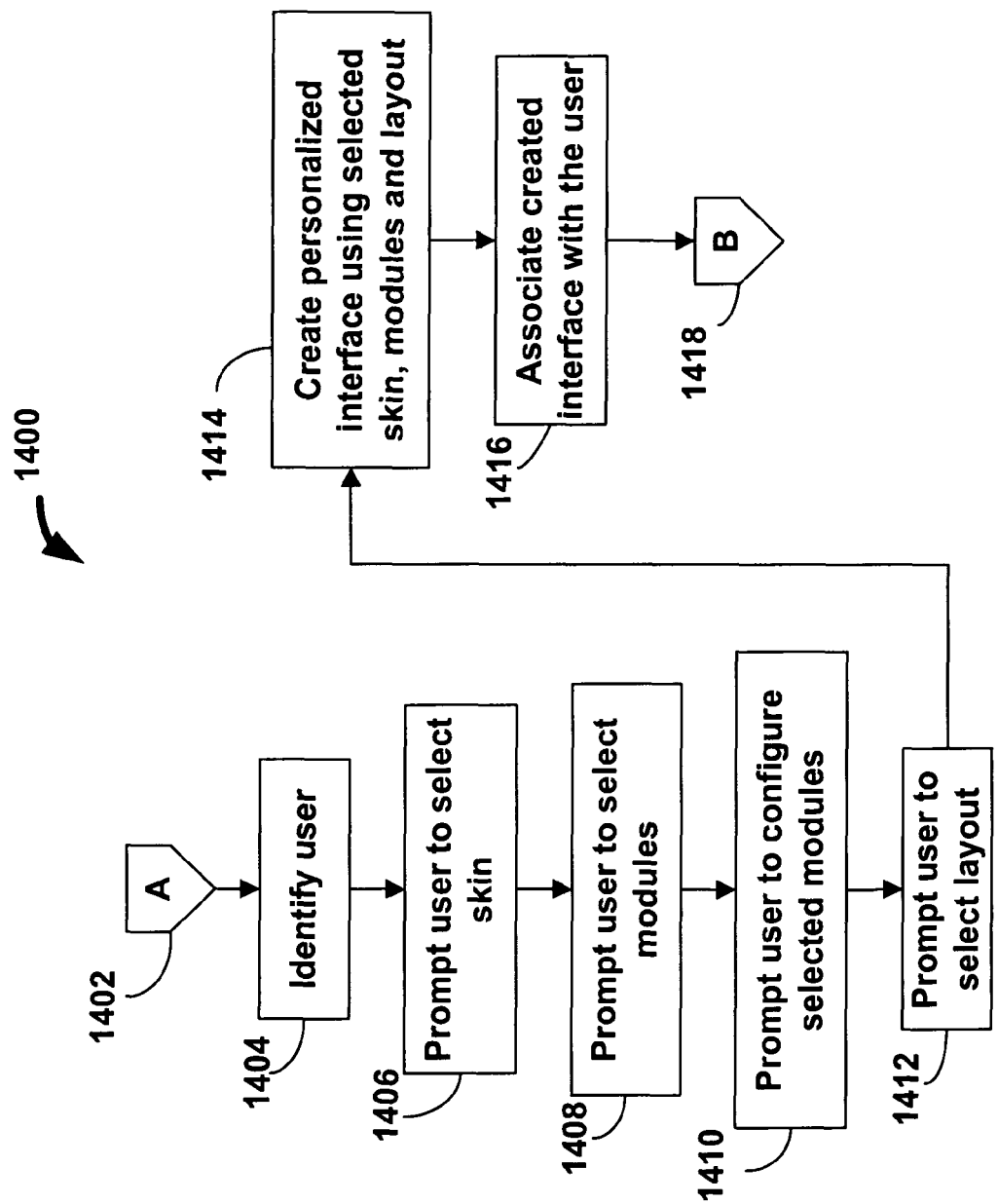
FIG. 14 is an illustrative flow chart of a process for prompting a user to create a personalized interface in accordance with the principles of the present invention.

FIG. 14 shows illustrative process 1400 for prompting a user to select a personalized interface. Process 1400 starts at step 1402, which may correspond to step 1208 of process 1200 (FIG. 12). At step 1404, the interactive media guidance application identifies the user. For example, the interactive media guidance application may request that the user log-in or provide identifying information (e.g., a username, personal code or number).

At step 1406, the interactive media guidance application prompts the user to select a skin. For example, the interactive media guidance application may display a plurality of skins and prompt the user to select one (e.g., using screen 800, FIG. 8). At step 1408, the interactive media guidance application prompts the user to select modules. For example, the interactive media guidance application may display a plurality of modules and prompt the user to select at least one. At step 1410, the interactive media guidance application prompts the user to configure the modules selected at step 1408. For example, the interactive media guidance application may prompt the user to select a module and provide the rules for selecting content to display in the module (e.g., prompt the user to specify interests for a recommendations module, for example using screen 900, FIG. 9).

At step 1412, the interactive media guidance application prompts the user to select a layout for the modules selected at step 1408. For example, the interactive media guidance application may display a sample layout, and prompt the user to place modules in the screen. In some embodiments, the user may re-size one or more modules to fit a particular layout. At step 1414, the interactive media guidance application creates a personalized interface using the selected skin, modules and layout. At step 1416, the interactive media guidance application associates the personalized interface with the user identified at step 1404. Process 1400 then moves to step 1418 and ends. In some embodiments, step 1418 may correspond to step 1210 of process 1200 (FIG. 12).

One skilled in the art will appreciate that the invention can be practiced by other than the prescribed embodiments, which are presented for purposes of illustration and not of limitation, and the invention is limited only by the claims which follow.

What is claimed is:

1. A method for rearranging the display of media guidance information in an interactive media guidance application, comprising:
   partitioning a day into day parts;
   identifying media accessed by a user device at a current day part of the day parts;
   retrieving sets of user preferences;
   comparing each of the sets of user preferences to the media associated with the current day part;
   determining whether any of the sets of user preferences are associated with the media accessed at the current day part;
   in response to determining that a set of user preferences of the sets of user preferences is associated with the media accessed at the current day part:
      automatically identifying a user, associated with the set of user preferences, as associated with the current day part; and
      generating for display, on the user device, media guidance information using a combination of modules associated with the user; and
   in response to determining that none of the sets of user preferences are associated with the media accessed at the current day part, generating for display, on the user device, a second combination of modules associated with a day part subsequent to the current day part, wherein the day part subsequent to the current day part is associated with another set of user preferences of the sets of user preferences.

2. The method of claim 1, wherein each of the sets of user preferences is associated with one user of a plurality of users.

3. The method of claim 2, wherein the combination of modules is selected based on the identified set of preferences.

4. The method of claim 3, further comprising:
   monitoring user interactions with the interactive media guidance application; and
   assigning the set of user preferences based on the monitored user interactions.

5. The method of claim 2, wherein the day part subsequent to the current day part is associated with a second user.

6. The method of claim 1, wherein the day parts are repeated for a plurality of days of the week.

7. The method of claim 6, wherein the day parts are repeated every day of the week.

8. The method of claim 1, wherein the generating for display media guidance information using the combination of modules comprises dynamically generating the combination of modules based on the user.

9. The method of claim 1, wherein generating for display media guidance information using the combination of modules comprises selecting a pre-existing combination of modules from a library of pre-existing combinations based on the user.

10. The method of claim 1, wherein the interactive media guidance application is an interactive program guide.

11. The method of claim 1, wherein the media guidance information displayed using the combination of modules comprises television program information.

12. The method of claim 1, wherein each module of the combination of modules is selected from the group consisting of: a recommendations module, a recorded programs module, an on-demand module, a listings module, a date and time module, a news module, a sports module, a weather module, a local module, a movie module, and an on-line module.

13. A system for rearranging the display of media guidance information in an interactive media guidance application, the system comprising control circuitry, the control circuitry configured to:
  partition a day into day parts;
  identify media accessed on a display device at a current day part of the day parts;
  retrieve sets of user preferences;
  compare each of the sets of user preferences to the media associated with the current day part;
  determine whether any of the sets of user preferences are associated with the media accessed at the current day part;
  in response to determining that a set of user preferences of the sets of user preferences is associated with the media accessed at the current day part:
    automatically identify a user, associated with the set of user preferences, as associated with the current day part; and
    direct the display device to display media guidance information using a combination of modules associated with the user; and
  in response to determining that none of the sets of user preferences are associated with the media accessed at the current day part, generating for display, on the user device, a second combination of modules associated with a day part subsequent to the current day part, wherein the day part subsequent to the current day part is associated with another set of user preferences of the sets of user preferences.

14. The system of claim 13, wherein each of the sets of user preferences is associated with one user of a plurality of users.

15. The system of claim 14, wherein the control circuitry is configured to select the combination of modules based on the identified set of preferences.

16. The system of claim 15, wherein the control circuitry is further configured to:
  monitor user interactions with the interactive media guidance application; and
  assign the set of user preferences based on the monitored user interactions.

17. The system of claim 14, wherein the day part subsequent to the current day part associated with a second user.

18. The system of claim 13, wherein the day parts are repeated for a plurality of days of the week.

19. The system of claim 18, wherein the day parts are repeated every day of the week.

20. The system of claim 13, wherein displaying media guidance information using the combination of modules comprises dynamically generating the combination of modules based on the user.

21. The system of claim 13, wherein displaying media guidance information using the combination of modules comprises selecting a pre-existing combination of modules from a library of pre-existing combinations based on the user.

22. The system of claim 13, wherein the interactive media guidance application is an interactive program guide.

23. The system of claim 13, wherein the media guidance information displayed using the first combination of modules comprises television program information.

24. The system of claim 13, wherein each module of the combination of modules is selected from the group consisting of: a recommendations module, a recorded programs module, an on-demand module, a listings module, a date and time module, a news module, a sports module, a weather module, a local module, a movie module, and an on-line module.

* * * * *